United States Patent
Lee

(10) Patent No.: US 7,277,112 B2
(45) Date of Patent: Oct. 2, 2007

(54) MULTI-BEAM LIGHT SOURCE UNIT AND LASER SCANNING UNIT HAVING THE SAME STRUCTURE

(75) Inventor: Tae-kyoung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 361 days.

(21) Appl. No.: 10/828,336

(22) Filed: Apr. 21, 2004

(65) Prior Publication Data

US 2005/0093967 A1    May 5, 2005

(30) Foreign Application Priority Data

Nov. 5, 2003    (KR)    ............. 10-2003-0077850

(51) Int. Cl.
*B41J 27/00* (2006.01)
(52) U.S. Cl. ........................ 347/242; 347/257
(58) Field of Classification Search ............. 347/238, 347/241–245, 256–261, 263, 254; 372/107
See application file for complete search history.

(56) References Cited

U.S. PATENT DOCUMENTS

| 5,734,514 | A | 3/1998 | Han |
| 6,320,647 | B1 | 11/2001 | Makino |
| 6,687,283 | B2* | 2/2004 | Naoe ........................ 372/107 |
| 6,992,690 | B2* | 1/2006 | Mogi et al. ................ 347/238 |
| 2002/0001118 | A1 | 1/2002 | Nakajima |
| 2005/0093966 | A1* | 5/2005 | Lee .......................... 347/238 |
| 2005/0206717 | A1* | 9/2005 | Boyatt et al. ............. 347/242 |

FOREIGN PATENT DOCUMENTS

| CN | 2156602 Y | 2/1994 |
| CN | 1247991 A | 3/2000 |
| JP | 58-086606 | 5/1983 |
| JP | 09-211357 | 8/1997 |
| JP | 09-243944 | 9/1997 |
| JP | 10-260369 | 9/1998 |
| JP | 11-242170 | 9/1999 |
| JP | 11-340567 | 12/1999 |
| JP | 11-352432 | 12/1999 |
| JP | 2000-162536 | 6/2000 |
| JP | 2003-075702 | 3/2003 |
| KR | 1999-040797 | 12/1999 |

* cited by examiner

*Primary Examiner*—Hai Pham
(74) *Attorney, Agent, or Firm*—Roylance, Abrams, Berdo & Goodman, LLP

(57) ABSTRACT

A multi-beam laser scanning unit including a laser diode unit for discharging a plurality of laser beams, a rotational member for supporting the diode unit and rotating to a substantially aligned position between a plurality of the laser beams, a fixing member for supporting the rotational member in a rotatable manner, a temporary joining part for maintaining joining status between the rotational member and the fixing member in such a way that the rotational member easily rotates until position alignment between a plurality of the laser beams is achieved, and a fixing part for fixing the rotated rotational member to the fixing member.

25 Claims, 8 Drawing Sheets

MULTI-BEAM LIGHT SOURCE UNIT AND LASER SCANNING UNIT HAVING THE SAME STRUCTURE

CROSS-REFERENCE TO RELATED APPLICATIONS

This application claims the benefit of Korean Patent Application No. 2003-77850 filed Nov. 5, 2003, in the Korean Intellectual Property Office, the entire contents of which are incorporated herein by reference.

BACKGROUND OF THE INVENTION

1. Field of the Invention

The present invention relates to a laser scanning unit for use in an image forming apparatus such as a laser beam printer or a digital copying machine. More particularly, the present invention is related to a multi-beam laser scanning unit and a multi-beam light source unit having an improved structure, capable of recording a plurality of lines simultaneously using a plurality of laser beams.

2. Description of the Related Art

Recently developed electrophotographic image forming devices are employing a multi-beam laser scanning unit for simultaneously recording a plurality of lines using a plurality of laser beams. One example of such a device includes a laser-beam printer. The multi-beam laser scanning unit simultaneously scans a plurality of laser beams spaced apart from each other. As shown in FIG. 1, the multi-beam laser scanning unit comprises a multi-beam light source unit 10, a cylindrical lens 20, a polygon mirror 30, an image resulting lens 40, a detecting mirror 51 and an optical sensor 52 for detecting a synchronous signal, and a frame 60 for receiving and supporting the above elements.

The multi-beam light source unit 10 comprises a laser diode 11 for discharging at least two laser beams $P_1$ and $P_2$, a diode holder 12 for fixing the laser diode 11, an operation circuit board 13 for controlling operation of the laser diode 11, a collimating lens 14 for converting a plurality of the laser beams discharged from the laser diode 11, into a parallel light, and a lens holder 15 joined to the diode holder 12, for supporting the collimating lens 14.

The two laser beams $P_1$ and $P_2$ discharged from the laser diode 11 are made parallel by the collimating lens 14, and illuminate a reflecting surface of the polygon mirror 30 through the cylindrical lens 20. The image reflected from the surface of the polygon mirror 30 passes through an image resulting lens 40 onto a photosensitive material of the rotational drum (not shown).

The cylindrical lens 20 linearly condenses the laser beams $P_1$ and $P_2$ on the reflection surface of the polygon mirror 30, whereby a point image results on the photosensitive material of the rotational drum. The point image is not distorted due to a surface slope of the polygon mirror 30. The image resulting lens 40 comprises a spherical lens and a toric lens. The image resulting lens 40 performs the functions of preventing point image distortion on the photosensitive material, which is similar to the function of the cylindrical lens 20, and amends the image so that the point image can be scanned in a primary scanning direction at a constant velocity on the photosensitive material.

The two laser beams $P_1$ and $P_2$ are separated, respectively, at the end of the primary scanning surface by the detecting mirror 51, and introduced to the optical sensor 52 positioned on the opposite side of the primary scanning surface. The two laser beams P1 and P2 are then converted into a recording initiation signal by the controller (not shown), and transmitted to the laser diode 11. The laser diode 11 starts recording modulation of the two laser beams $P_1$ and $P_2$ by receiving the recording initiation signal. By adjusting the recording modulation timing of the two laser beams $P_1$ and $P_2$, the recording initiation position of an electrostatic latent image formed on the photosensitive material of the rotational drum is controlled.

The cylindrical lens 20, the polygon mirror 30, and the image resulting lens 40 are mounted on the bottom wall of the frame 60. After the optical parts are mounted on the frame 60, the opening on the upper part of the frame 60 is sealed by a cover (not shown).

The multi-beam light source unit 10 is mounted on the sidewall 60a of the frame 60 as shown in FIG. 2. When the multi-beam light source unit 10 is mounted on the frame 60, the diode holder 12 is inserted into an opening 60b formed on the sidewall 60a. Following insertion of the multi-beam light source unit 10, the focus and optical axis of the collimating lens 14 are adjusted, and the lens holder 15 is fixed to the diode holder 12.

After the horizontal and vertical positions between the laser beams $P_1$ and $P_2$ are adjusted by rotating the entire multi-beam light source unit 10, by as much as up to a predetermined angle (θ) with respect to the optical axis, the diode holder 12 is fixed to the sidewall 60a of the frame 60 by means of a screw 61.

According to the general multi-beam laser scanning unit described above, however, the horizontal and vertical positions between the laser beams are adjusted by rotating the multi-beam light source unit 10 a predetermined angle with the multi-beam light source unit 10 only temporarily assembled to the frame 60 of the laser scanning unit. Additionally, another manufacturing process step is added because the multi-beam light source unit 10 is fixed while rotated in the frame 60 of the laser scanning unit in the assembly line of the laser scanning unit. Thus, job efficiency and productivity are negatively affected. For example, manufacturing equipment becomes large and complicated because the equipment for adjusting the horizontal and vertical positions between the laser beams from the multi-beam light source unit 10, which is a large-scale rotation adjuster having a suitable size to accommodate the laser scanning unit, must be added to the main assembly line. Lastly, adjustment is difficult to perform and therefore job efficiency deteriorates.

SUMMARY OF THE INVENTION

An object of the present invention is to solve at least the above problems and/or disadvantages and to provide at least the advantages described below. Accordingly, an object of the present invention is to provide a multi-beam light source unit and a laser scanning unit having the same whose structure is improved, capable of performing position alignment between a plurality of laser beams as well as enabling assembly of the light source unit in the assembly line of the multi-beam light source unit.

In order to achieve the above-described aspects of the present invention, there is provided a multi-beam light source unit, which comprises a diode unit for discharging a plurality of laser beams, a rotational member for supporting the diode unit and rotating to align a plurality of the laser beams, and a fixing member for supporting the rotational member in a rotatable manner. The multi-beam light source unit further comprises a temporary joining part for maintaining a joining status between the rotational member and the fixing member. The joining status is maintained such that the rotational member can rotate easily, but once position alignment between the plurality of the laser beams has been achieved cannot rotate easily at the rotated position. The multi-beam light source unit still further comprises a fixing part for fixing the rotated rotational member to the fixing member.

The temporary joining part comprises a rotational boss installed in a projecting manner on the central part of the rotational member, a boss cavity formed on the fixing member for receiving the rotational boss in a rotatable manner, and a plurality of elastic ribs for elastically supporting the outer periphery of the rotational boss at a plurality of positions on the inner periphery of the boss cavity.

According to an embodiment of the present invention, four elastic ribs are formed with equal interval on the inner periphery of the boss cavity, and holes for generating elastic force on the elastic rib are formed, respectively, on the outer periphery of the four elastic ribs.

According to an embodiment of the present invention, a plurality of contact surface parts are formed, on an outer periphery of the rotational boss, for collapsing to a predetermined depth. The plurality of contact surface parts contact at least one elastic rib. A predetermined interval is maintained between the inner periphery of the boss cavity and the outer periphery of the rotational boss except in the area of the elastic rib and the contact surface part.

According to an embodiment of the present invention the diode unit comprises a multi-beam semiconductor laser diode having at least two laser beam discharging parts, and an operation circuit board for controlling operation of this laser diode. The operation circuit board is joined to the rotational member.

According to an embodiment of the present invention the fixing part comprises a pair of screws fastened from the rotational member to the fixing member, and the rotational member has an arc-shaped long hole through which the pair of the screws passes. The fixing member comprises a first member having the boss cavity and a second member vertically extended from the first member and having a settle unit and a pair of fixing parts.

The multi-beam light source unit according to another embodiment of the present invention comprises a collimating lens for converting a plurality of laser beams discharged from the diode unit into a parallel light, and a lens holder for fixing this lens. The lens holder is settled down on the settle unit of the second member.

To achieve the above-described objects of the present invention, the multi-beam laser scanning unit comprises a multi-beam light source unit for discharging a plurality of laser beams, a scanning/image resulting unit for forming an image on the scanned surface by scanning a plurality of laser beams, a frame for supporting the multi-beam light source unit and the scanning/image resulting unit. The multi-beam light source unit preferably comprises a laser diode having at least two laser beam discharging parts and an operation circuit board for controlling operation of the laser diode. The multi-beam laser scanning unit further comprises a rotational member for supporting the laser diode and the operation circuit board and rotating to align position between a plurality of the laser beams, a fixing member for supporting the rotational member in a rotatable manner, and a temporary joining part for maintaining joining status between the rotational member and the fixing member. The joining status is maintained such that the rotational member can rotate easily, but once position alignment between the plurality of the laser beams has been achieved cannot rotate easily at the rotated position. The multi-beam light source unit still further comprises a fixing part for fixing the rotated rotational member to the fixing member.

In accordance with still another embodiment of the present invention, the multi-beam light source unit is fixed and installed in the bottom wall of the frame. Furthermore, the scanning/image resulting unit comprises a polygon mirror for scanning a plurality of laser beams discharged from the multi-beam light source unit, an image resulting lens for forming the laser beam scanned by the polygon mirror on the scanned surface, and a cylindrical lens for linearly condensing a plurality of the laser beams on a reflection surface of the polygon mirror, and a synchronization signal detecting unit.

According to embodiments of the present invention, the multi-beam light source unit is mounted on the bottom wall of the frame in the main assembly line after position alignment between a plurality of laser beams is performed in the assembly line of the multi-beam light source unit. Therefore, structural simplification of the scanning/image resulting unit is realized as well as reducing the size of the assembly line. Furthermore, by using the embodiments of the present invention, it is possible to perform position alignment between the laser beams in an easy and accurate manner.

BRIEF DESCRIPTION OF THE DRAWINGS

The above objects and other advantages of the present invention will be more apparent from the following detailed description when taken in conjunction with the accompanying drawing figures, in which.

DETAILED DESCRIPTION OF THE PREFERRED EMBODIMENTS

Figure 1:
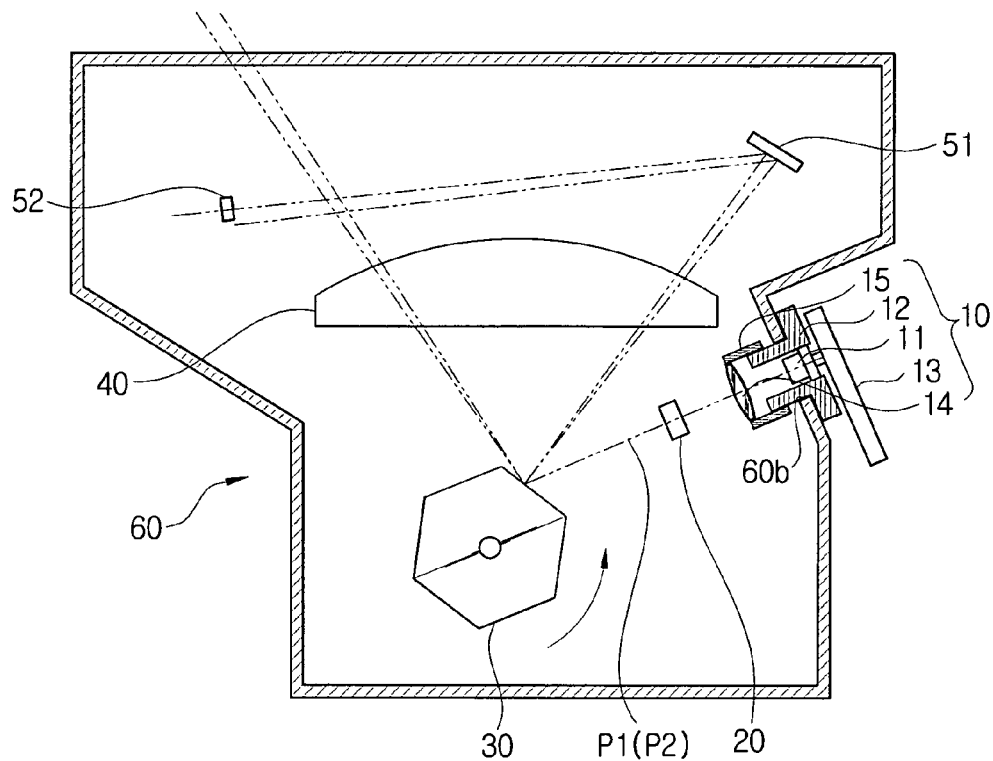
FIG. 1 is a plan view schematically illustrating a conventional multi-beam laser scanning unit.
Figure 2:
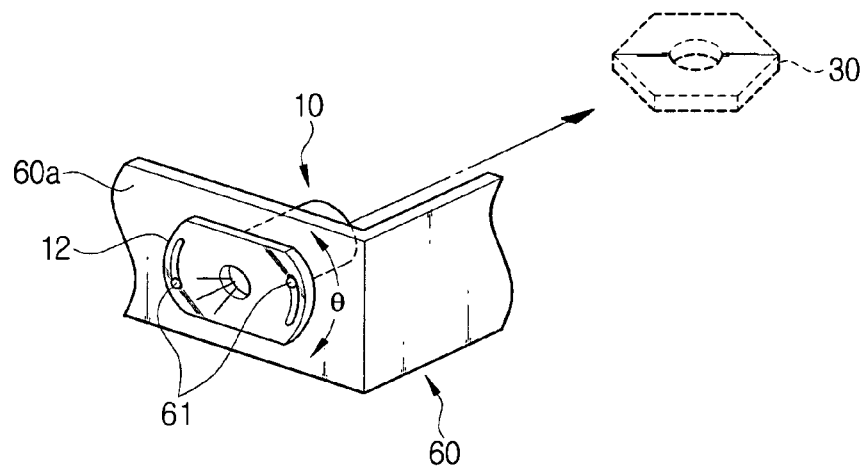
FIG. 2 is a perspective view of the conventional multi-beam light source unit mounted on a side-wall of the multi-beam laser scanning unit of FIG. 1.

An embodiment of the present invention will now be described with reference to the accompanying drawings, in which like elements of the figures have been given the same reference numbers. The matters defined in the ensuing detailed description are provided to assist in a comprehensive understanding of the invention, but should not be seen as limiting in any manner. Thus, it is apparent that the embodiments of the present invention can be carried out without those defined matters. Also, well-known functions or constructions have been omitted for conciseness. Throughout the drawing figures it will be understood that like reference numbers refer to like features and structures.

Figure 3A:
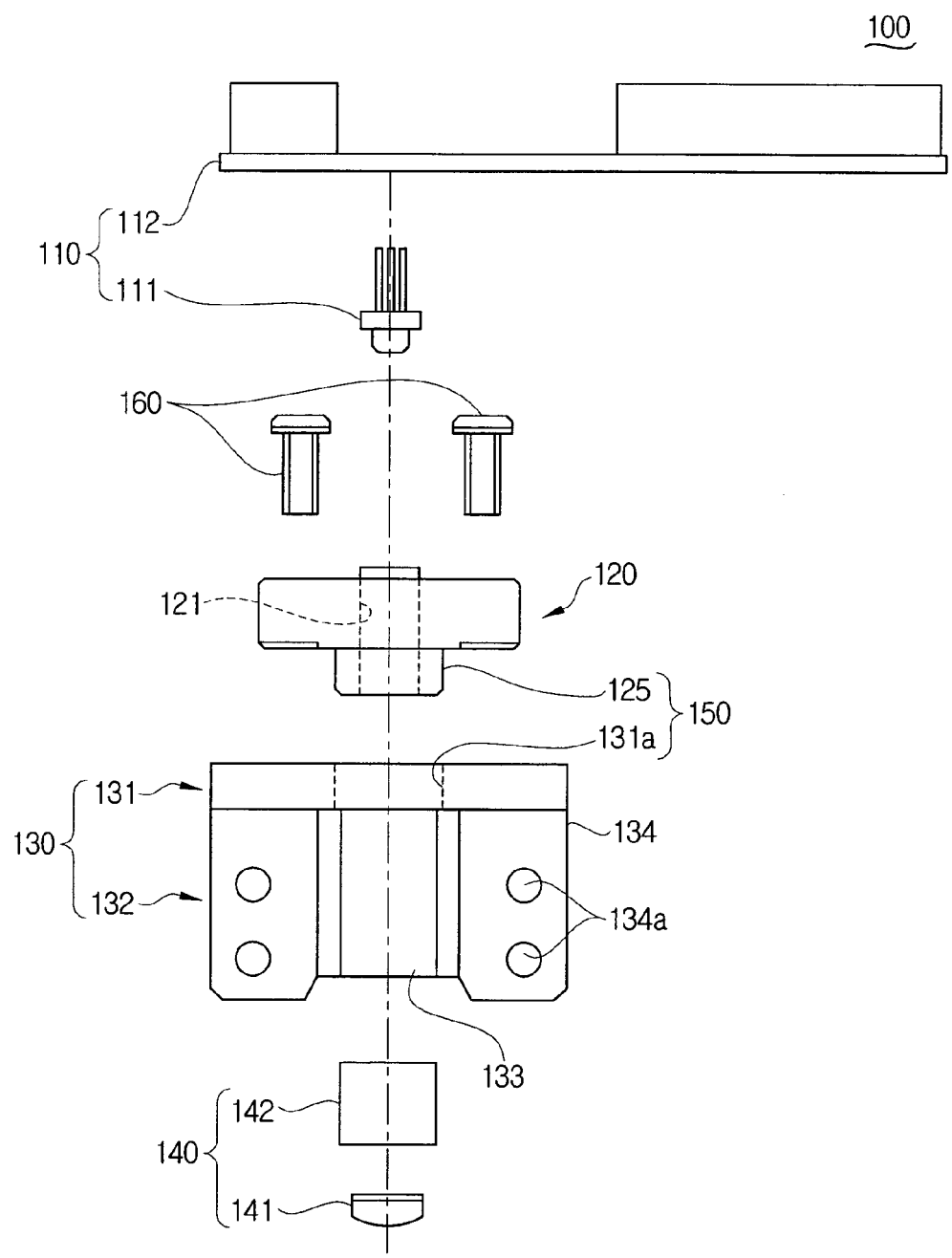
FIGS. 3A and 3B are an exploded view and an assembly view, respectively, of a multi-beam light source unit according to an embodiment of the present invention.
Figure 3B:
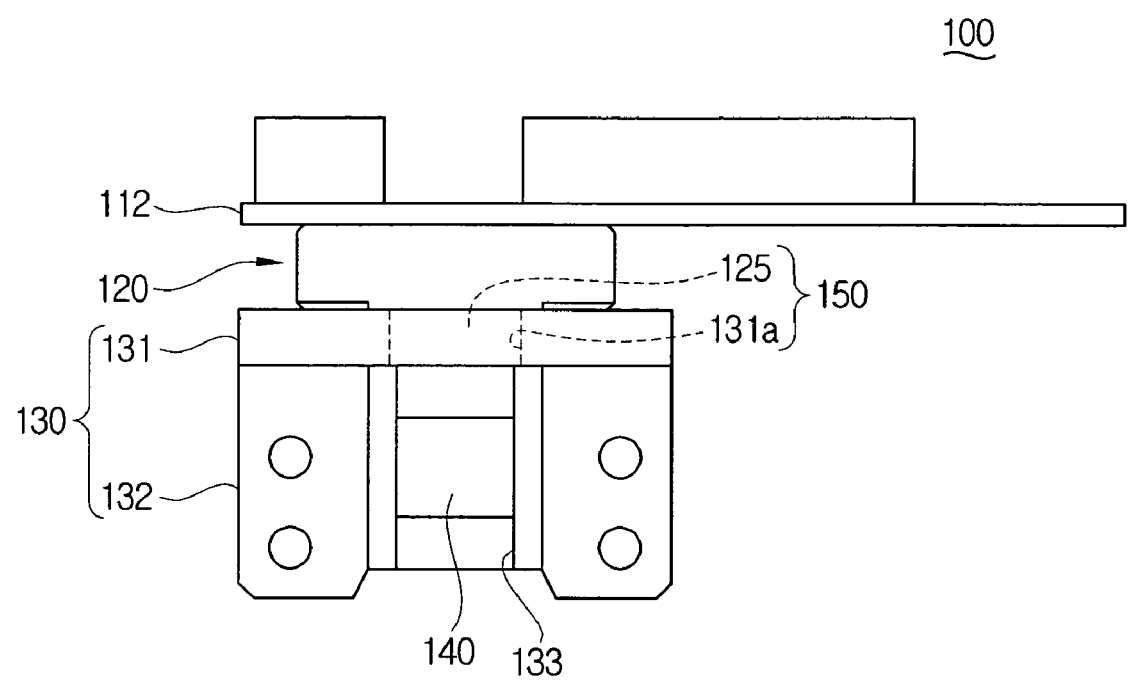

As shown in FIGS. 3A and 3B, the multi-beam light source unit 100 comprises a diode unit 110, a rotational member 120, a fixing member 130, a collimating lens assembly 140, a temporary joining part 150 for maintaining a temporary joining status between the rotational member 120 and the fixing member 130, and a fixing part 160.

Figure 9:
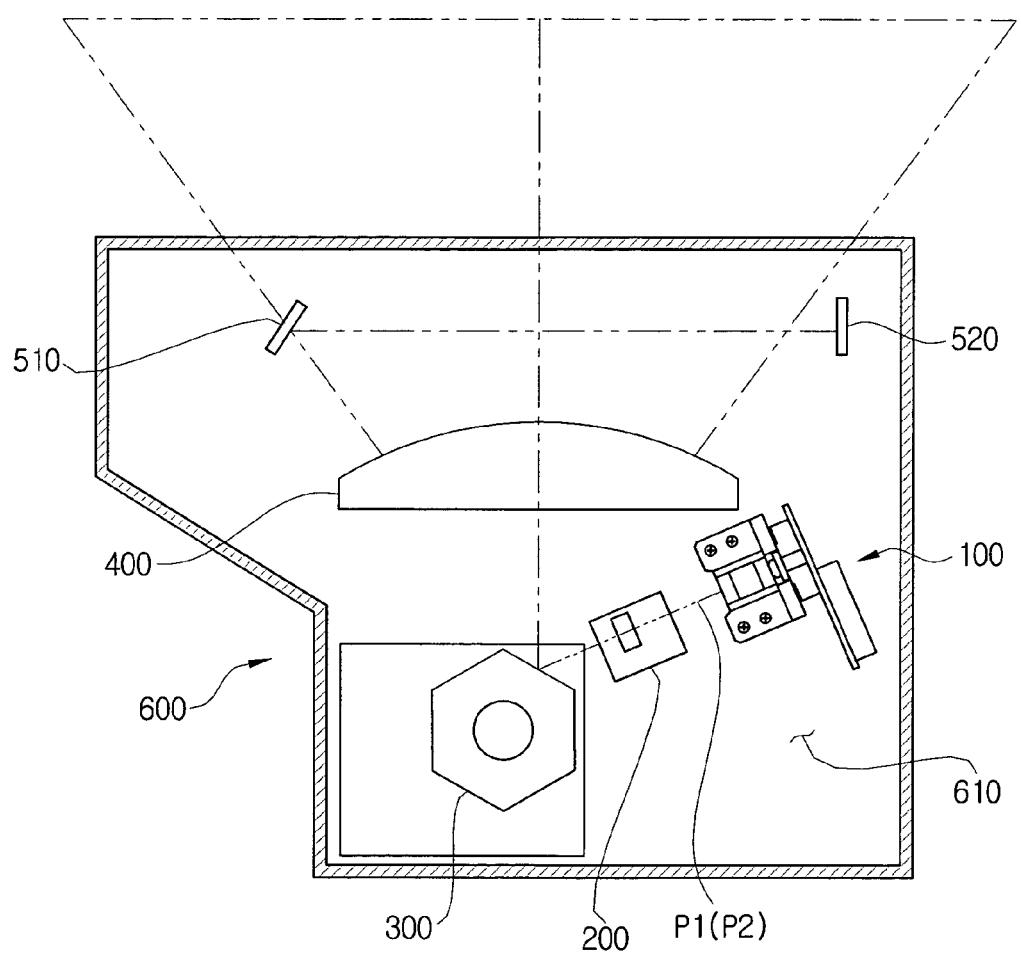
FIG. 9 is a plan view of a laser scanning unit having a multi-beam light source unit according to an embodiment of the present invention.

The diode unit 110 comprises a multi-beam semiconductor laser diode 111 for discharging a plurality of laser beams $P_1$ and $P_2$ (as shown in FIG. 9), and an operation circuit board 112 for controlling operation of the laser diode 111. The laser diode 111 is mounted in the operation circuit board 112.

Figure 7A:
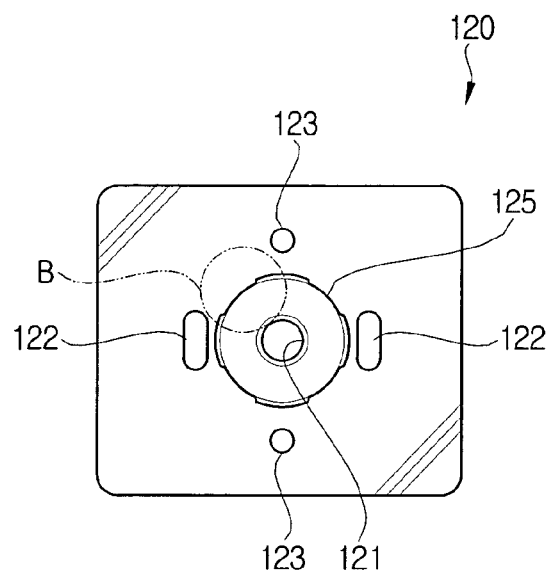
FIGS. 7A and 7B are detailed views of a rotational boss provided to a rotational member according to an embodiment of the present invention.
Figure 7B:
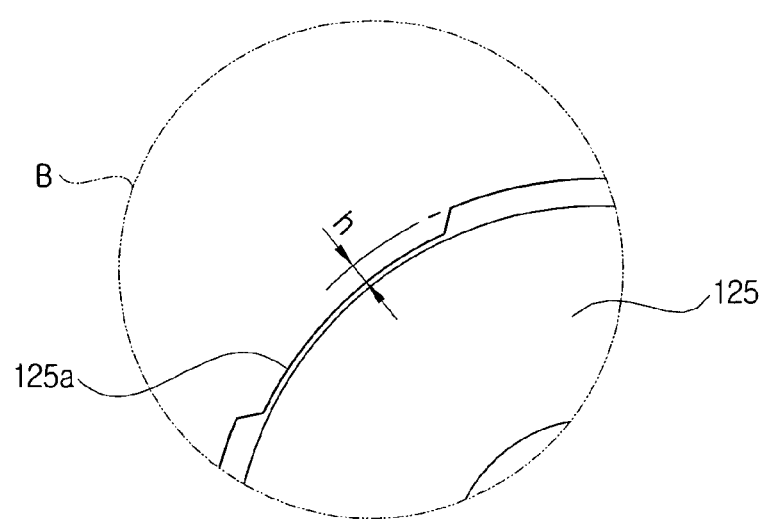

The rotational member 120 supports the laser diode 111 and the operation circuit board 112, and is rotatable with respect to the fixing member 130. As shown in FIGS. 7A and 7B, an indentation hole 121 into which the laser diode 111 is pushed and fixed, is formed in a passing manner through the central portion of the rotational member 120, and a pair of arc-shaped long slots 122 are formed on the right and left sides of the rotational member 120, and a pair of circular holes 123 are formed on up and down sides of the rotational member 120, respectively.

The pair of circular holes 123 are holes through which a fastening member (not shown), such as a screw, can be fastened for joining the operation circuit board 112 to the rotational member 120. The pair of arc-shaped long slots 122 are slots through which a screw (i.e., fixing part 160) can be fastened for joining the rotational member 120 to the fixing member 130. The long slots 122 are formed such that the rotational member 120 can be rotated forward and backward with respect to the fixing member 130 with the fixing part 160 fastened loosely.

The rotational member 120 has a rotational boss 125 which functions as a rotational central axis. The rotational boss 125 is projected a predetermined height above the surface of the rotational member 120 that corresponds to the fixing member 130.

Figure 5:
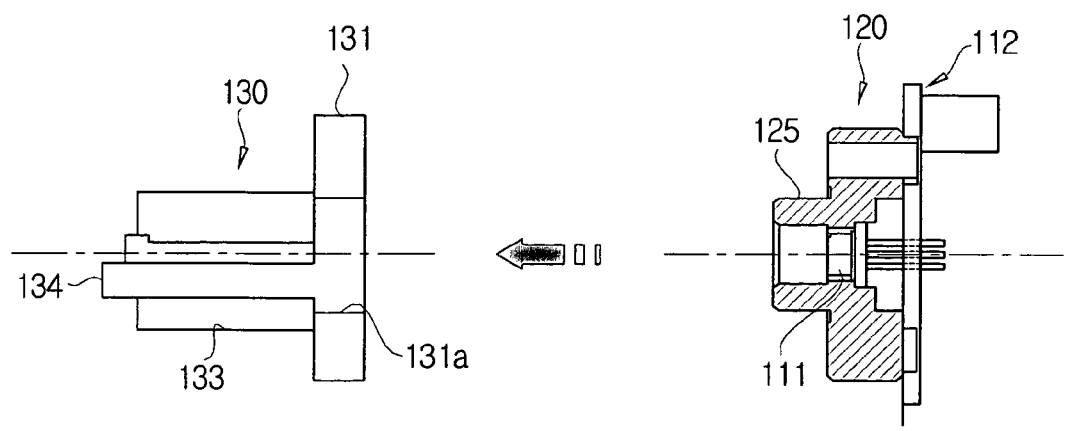
FIG. 5 is a cross-sectional view of a joining status between the fixing member and the rotational member according to an embodiment of the present invention.
Figure 6A:
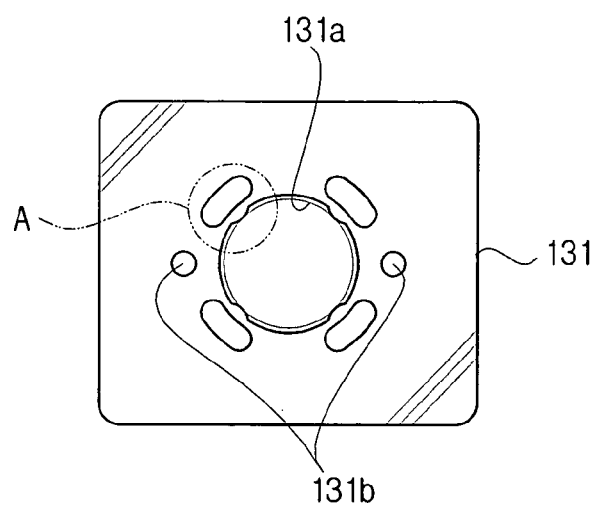
FIGS. 6A and 6B are detailed views of an elastic rib provided to the fixing member according to an embodiment of the present invention.
Figure 6B:
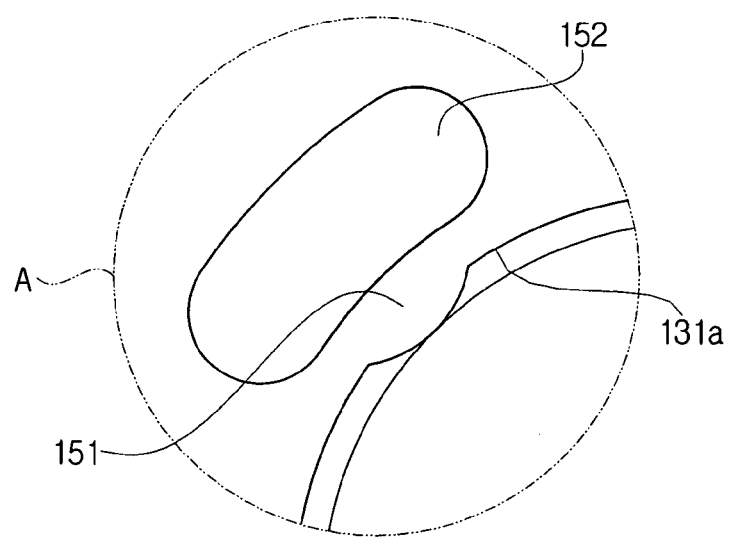

The fixing member 130 supports the rotational member 120 in a rotatable manner. The fixing member 130 comprises a first member 131 having a boss cavity 131a into which the rotational boss 125 of the rotational member 120 is inserted in a rotatable manner. The fixing member 130 also comprises a second member 132 vertically extended from the first member 131. As shown in FIGS. 6A and 6B, the first member 131 has, on its right and left sides, holes 131b that correspond to the long slots 122 of the rotational member 120. In addition, the second member 132 has, on its central portion, a settle unit 133 (see FIG. 5) formed in a semicircular groove, for settling down the collimating lens assembly 140. The second member 132 further comprises a fixing part 134 having a plurality of holes 134a, for fixing the second member 132 to a frame 600 (described in greater detail below with reference to FIG. 9) using a fastening member such as a screw. The holes 134a are formed on both sides of the settle unit 133.

The collimating lens assembly 140 comprises a collimating lens 141 and a barrel-shaped lens holder 142 for supporting the lens 141. The collimating lens assembly 140 is settled down on the settle unit 133 formed on the second member 132 of the fixing member 130. The collimating lens assembly 140 performs the function of converting a plurality of laser beams discharged from the multi-beam laser diode 111 into parallel light.

It should be noted that the temporary joining part 150 maintains a temporary joining status between the rotational member 120 and the fixing member 130 in such a manner that the rotational member 120 easily rotates, but once positional alignment between the plurality of laser beams has been achieved does not provide for easy movement of the rotational member 120.

The temporary joining part 150 includes a plurality of elastic ribs 151 (shown in FIGS. 4 and 6B) for elastically supporting the outer periphery of the rotational boss 125 at a plurality of positions on the inner periphery of the boss cavity 131a, as well as the rotational boss 125 and the boss cavity 131a.

Figure 4:
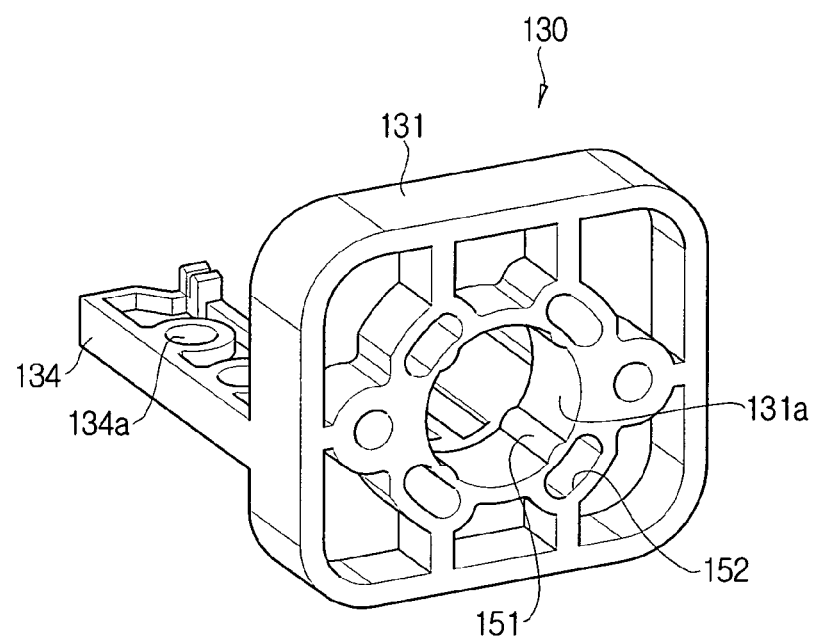
FIG. 4 is an extracted, perspective view of a fixing member according to an embodiment of the present invention.

In accordance with an embodiment of the invention, four elastic ribs 151 are formed at substantially equal intervals of or about 90 degrees on the inner periphery of the boss cavity 131a, and slots 152, for generating an elastic force on the elastic ribs 151 are formed, respectively, on the outer side of these four elastic ribs 151 (see FIGS. 4, 6A and 6B). As one skilled in the art can appreciate, the specific example of four elastic ribs 151 is not meant to be limiting, as more or fewer elastic ribs (for example, three or five elastic ribs) can be provided in accordance with the embodiments of the present invention.

Figure 8:
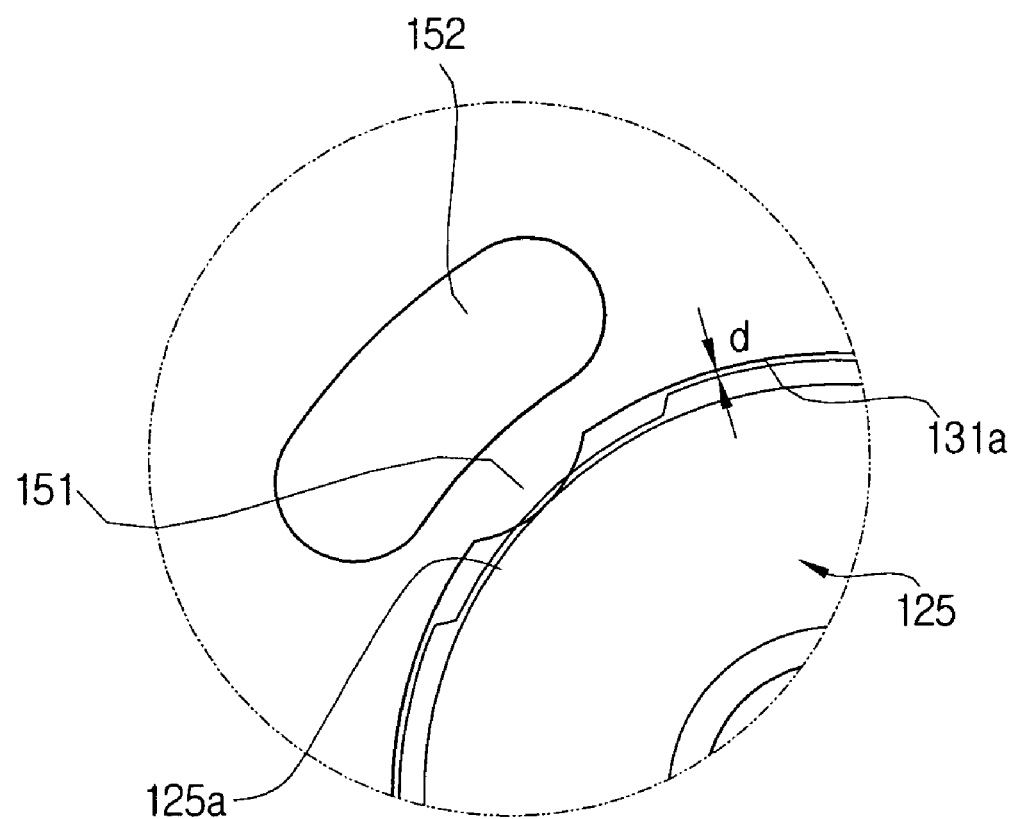
FIG. 8 is a detailed view of the rotational boss of FIG. 7B after it is inserted into the boss cavity of FIG. 6B.

A plurality of contact surface parts 125a (FIG. 7B) are formed on the portion of the outer periphery of the rotational boss 125. The plurality of contact surface parts 125a are formed to a predetermined depth h, as seen in FIG. 7B. As seen in FIG. 8, the plurality of contact surface parts 125a contact the plurality of elastic ribs 151, and a predetermined interval d is maintained between the inner periphery of the boss cavity 131a and the outer periphery of the rotational boss 125 (except in the area of the elastic rib 151 and the contact surface parts 125a). Therefore, the rotational boss 125 freely rotates in the inside of the boss cavity 131a but does not move about the position easily once positional alignment has been achieved. Therefore, positional alignment between a plurality of laser beams can be performed in an easy and accurate manner.

In the multi-beam light source unit 100 according to an embodiment of the present invention, a multi-beam laser diode 111 is pushed into and joined with an indentation hole 121 of the rotational member 120, and an operation circuit board 112 is joined to the surface opposite to the surface where the rotational boss 125 of the rotational member 120 is formed. The collimating lens assembly 140 is settled down on the fixing member 130 in settle unit 133.

Fixing part 160 temporarily joins the rotational member 120 (to which the laser diode 111 and the operation circuit board 112 are joined) and the fixing member 130 (on which the collimating lens assembly is settled down) with the rotational boss 125 of the rotational member 120 inserted into the boss cavity 131a of the fixing member 130. The fixing part 160 is fastened through the arc-shaped long hole 122 of the rotational member 120. As shown in FIG. 8, a plurality of elastic ribs 151 elastically contacts the contact surface parts 125a of the rotational boss 125, supporting the rotational boss 125, whereby the rotational boss 125 maintains temporary joining status that does not move easily once positional alignment between the laser beams has been achieved. Preferably, the temporary joining status is such that rotational movement does not occur without an external force.

Under such temporary joining status, the rotational member 120 is rotated a predetermined angle set in advance with respect to the fixing member 130, using jigs for position alignment between the plurality of laser beams, so that position alignment between the laser beams is achieved.

After positional alignment between the laser beams has been achieved, the rotational member 120 is completely fixed to the fixing member 130 by fastening the screw completely, so that assembling of the multi-beam light source unit 100 is completed.

After the rotational member 120 has been completely fixed to the fixing member 130 the multi-beam light source unit 100, now completely assembled in the foregoing manner, is moved to the main assembly line of the laser scanning unit, and then mounted on a bottom wall 610 of a frame 600 as shown in FIG. 9.

As discussed above, conventional art alignment systems and methods provide for alignment between the laser beams only after the multi-beam light source unit has been assembled, and the multi-beam light source unit fixed to the side-wall of the frame in the main assembly line. According to the embodiments of the present invention, however, the multi-beam light source unit 100 has the alignment process performed in a sub-assembly, separate from the main assembly. The aligned multi-beam light source unit 100 assembled in this manner is then simply mounted on the bottom wall 610 of the frame 600 in the main assembly line, and a conventional large-scale jig for position alignment between the laser beams need not be provided in the main assembly line. The manufacturing process is therefore simplified, and the need for large-scale equipment (position alignment jigs) is eliminated.

FIG. 9 is a plan view of a laser scanning unit having the multi-beam light source unit 100 according to an embodiment of the present invention. As shown in FIG. 9, the multi-beam light source unit 100 is mounted on the bottom wall 610 of the frame 600. Mounting of the multi-beam light source unit 100 is performed in a simple manner by fixing the fixing member 130 to the bottom wall 610 by means of the fastening member such as a screw. Particularly, since the multi-beam light source unit 100 is taken over to the main assembly line with the position alignment between the laser beams completed in the sub-assembly line, the assembly process is efficiently performed.

In addition to the multi-beam light source unit 100, a cylindrical lens 200, a polygon mirror 300, an image resulting lens 400 constituting a scanning/image resulting unit, a detecting mirror 510 and an optical sensor 520 constituting a synchronization signal detecting apparatus, are properly mounted on the bottom wall 610 of the frame 600.

As discussed in greater detail above, a plurality of laser beams $P_1$ and $P_2$ are discharged from the multi-beam light source unit 100 and are then linearly condensed on the reflection surface of the polygon mirror 300 by means of the cylindrical lens 200. The plurality of laser beams P1, P2 are then scanned by the polygon mirror 300. This causes an image to be formed on the photoconductive material of the rotational drum (not shown) by means of the image resulting lens 400.

The exposing process of the laser scanning unit need not be different from the conventional art. A multi-beam laser scanning unit built in accordance with the embodiments of the present invention, however, is characterized in that position alignment between the laser beams of the multi-beam light source unit 100 has been completed in the sub-assembly line, is taken over to the main assembly line and mounted on the frame upon assembly process, thereby eliminating the alignment step and equipment on the main assembly line.

As can be appreciated from the above description, according to the embodiments of the present invention, since position alignment job between the laser beams is performed during the assembly process of the multi-beam light source unit, the position alignment job can be performed in an easy and accurate manner.

Additionally, since the conventional large-scale jig for position alignment between the laser beams does not need to be provided to the main assembly line of the laser scanning unit, reductions in size and complexity of the equipment of the main assembly line can be achieved.

According to the embodiments of the present invention, assembling efficiency and productivity of the laser scanning unit can be improved.

While the invention has been shown and described with reference to certain preferred embodiments thereof, it will be understood by those skilled in the art that various changes in form and details can be made therein without departing from the spirit and scope of the invention as defined by the appended claims. Therefore, all such proper modifications, changes and equivalents of the embodiments of the present invention will fall within the scope of the invention.

What is claimed is:

1. A multi-beam light source unit comprising:
   a laser diode unit for discharging a plurality of laser beams;
   a rotational member for supporting the diode unit and rotating to a substantially aligned position between a plurality of the laser beams;
   a fixing member for supporting the rotational member in a rotatable manner;
   a temporary joining part for maintaining joining status between the rotational member and the fixing member such that the rotational member rotates under elastic force, wherein the elastic force is increased when the rotational member is rotated for position alignment between the plurality of the laser beams; and
   a fixing part for fixing the rotated rotational member to the fixing member.

2. The unit according to claim 1, wherein, the temporary joining part comprises:
   a rotational boss installed in a projecting manner on a central part of the rotational member, the rotational boss comprising an outer periphery having a varied radius;
   a boss cavity formed on the fixing member, for receiving the rotational boss in a rotatable manner; and
   a plurality of elastic ribs on an inner periphery of the boss cavity for elastically supporting the outer periphery of the rotational boss at a plurality of positions.

3. The unit according to claim 2, wherein the temporary joining part further comprises:
   the plurality of elastic ribs formed at substantially equal intervals on the inner periphery of the boss cavity; and
   a plurality of holes for generating the elastic force on the elastic ribs formed, respectively, on an outer periphery of the plurality of elastic ribs.

4. The unit according to claim 3, wherein the plurality of elastic ribs comprises four elastic ribs.

5. The unit according to claim 3, wherein the temporary joining part further comprises:
   a plurality of contact surface parts formed at a predetermined depth on a portion in the outer periphery of the rotational boss for contacting the plurality of elastic ribs, and wherein a predetermined interval is maintained between an inner periphery of the boss cavity rib and an outer periphery of the rotational boss, except between the elastic rib and the contact surface part.

6. The unit according to claim 2, wherein the fixing member comprises:
   a first member comprising the boss cavity; and
   a second member vertically extended from the first member and having a settle unit and a pair of fixing parts.

7. The unit according to claim 6, further comprising:
   a collimating lens for converting a plurality of laser beams discharged from the laser diode unit into a parallel light; and
   a lens holder for fixing the collimating lens, and wherein the lens holder is adapted to be settled down on the settle unit of the second member.

8. The unit according to claim 1, wherein the laser diode unit comprises:
   a multi-beam semiconductor laser diode having at least two laser beam discharging parts; and
   an operation circuit board for controlling operation of this laser diode, and wherein the operation circuit board is joined to the rotational member.

9. The unit according to claim 1, wherein the fixing part comprises:
   at least one screw for fastening the rotational member to the fixing member, and wherein the rotational member comprises an arc-shaped long slot through which the at least one screw passes.

10. The unit according to claim 9, wherein the fixing part further comprises a plurality of screws.

11. The unit according to claim 10, wherein the plurality of screws comprises two screws.

12. A multi-beam laser scanning unit comprising:
    a multi-beam light source unit for discharging a plurality of laser beams;
    a scanning/image resulting unit for forming an image on a scanned surface by scanning the plurality of laser beams;
    a frame for supporting the multi-beam light source unit and the scanning/image resulting unit, wherein the multi-beam light source unit comprises:
    a laser diode having at least two laser beam discharging parts;
    an operation circuit board for controlling operation of the laser diode;
    a rotational member for supporting the laser diode and the operation circuit board, and rotating to a substantially aligned position between a plurality of the laser beams;
    a fixing member for supporting the rotational member in a rotatable manner;
    a temporary joining part for maintaining joining status between the rotational member and the fixing member such that the rotational member rotates under elastic force, wherein the elastic force is increased when the rotational member is rotated for position alignment between the plurality of the laser beams; and
    a fixing part for fixing the rotated rotational member to the fixing member.

13. The unit according to claim 12, wherein the multi-beam light source unit is fixed and installed in a bottom wall of the frame.

14. The unit according to claim 13, wherein the scanning/image resulting unit comprises:
    a polygon mirror for scanning a plurality of laser beams discharged from the multi-beam light source unit;
    an image resulting lens for causing the laser beam scanned by the polygon mirror to impinge onto the scanned surface;
    a cylindrical lens for linearly condensing a plurality of the laser beams on a reflection surface of the polygon mirror; and
    a synchronization signal detecting unit.

15. The unit according to claim 13, wherein the temporary joining part comprises:
    a rotational boss installed in a projecting manner on a central part of the rotational member, the rotational boss comprising an outer periphery having a varied radius;
    a boss cavity formed on the fixing member, for receiving the rotational boss in a rotatable manner; and
    a plurality of elastic ribs on an inner periphery of the boss cavity for elastically supporting the outer periphery of the rotational boss at a plurality of positions.

16. The unit according to claim 15, wherein the temporary joining part further comprises:
    the plurality of elastic ribs formed at substantially equal intervals on the inner periphery of the boss cavity; and
    a plurality of holes for generating the elastic force on the elastic ribs, the holes formed on respective portions of an outer periphery of the plurality of elastic ribs.

17. The unit according to claim 16, wherein the plurality of elastic ribs comprises four elastic ribs.

18. The unit according to claim 16, wherein the temporary joining part further comprises:
    a plurality of contact surface parts formed at a predetermined depth on a portion in the outer periphery of the rotational boss for contacting the plurality of elastic ribs, and wherein a predetermined interval is maintained between an inner periphery of the boss cavity and an outer periphery of the rotational boss except between the elastic rib and the contact surface part.

19. The unit according to claim 13, wherein the fixing member comprises:
    a first member having the boss cavity; and
    a second member vertically extended from the first member and having a settle unit and at least one fixing part.

20. The unit according to claim 19, wherein the multi-beam light source unit further comprises:
    a collimating lens for converting a plurality of laser beams discharged from the laser diode unit into a parallel light; and
    a lens holder for fixing the collimating lens, and wherein the lens holder is settled down on the settle unit of the second member.

21. The unit according to claim 19, wherein the at least one fixing part comprises a pair of fixing parts.

22. The unit according to claim 12, wherein the fixing part comprises:
    at least one screw for fastening the rotational member to the fixing member, and wherein the rotational member has an arc-shaped long slot through which the at least one screw passes.

23. The unit according to claim 22, wherein the fixing part further comprises the at least one screw comprising a plurality of screws.

24. The unit according to claim 23, wherein the plurality of screws comprises a pair of screws.

25. A multi-beam light source unit comprising:
    a laser diode unit for discharging a plurality of laser beams;
    a rotational member for supporting the diode unit, said rotational member having a boss; and a fixing member for supporting the rotational member in a rotatable manner, wherein said fixing member includes a boss cavity and a plurality of elastic ribs on an inner periphery of the boss cavity for elastically supporting the outer periphery of the boss at a plurality of positions.

* * * * *